US012665259B2

(12) United States Patent
Lee

(10) Patent No.: US 12,665,259 B2
(45) Date of Patent: Jun. 23, 2026

(54) SECONDARY BATTERY

(71) Applicant: Samsung SDI Co., Ltd., Yongin-si (KR)

(72) Inventor: Hyun Soo Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1018 days.

(21) Appl. No.: 17/595,188

(22) PCT Filed: May 11, 2020

(86) PCT No.: PCT/KR2020/006194
§ 371 (c)(1),
(2) Date: Nov. 10, 2021

(87) PCT Pub. No.: WO2020/231134
PCT Pub. Date: Nov. 19, 2020

(65) Prior Publication Data
US 2022/0223978 A1      Jul. 14, 2022

(30) Foreign Application Priority Data

May 14, 2019     (KR) ........................ 10-2019-0056529

(51) Int. Cl.
*H01M 50/474*          (2021.01)
*H01M 10/04*           (2006.01)
(Continued)

(52) U.S. Cl.
CPC ..... *H01M 50/474* (2021.01); *H01M 10/0468* (2013.01); *H01M 50/477* (2021.01);
(Continued)

(58) Field of Classification Search
CPC ............. H01M 50/474; H01M 50/533; H01M 50/534; H01M 50/477
See application file for complete search history.

(56) References Cited

U.S. PATENT DOCUMENTS 8,628,878 B2     1/2014  Kim et al.
8,734,974 B2     5/2014  Lee
(Continued)

FOREIGN PATENT DOCUMENTS

JP        2000-195475 A       7/2000
KR    10-2011-0114411 A      10/2011
(Continued)

OTHER PUBLICATIONS

KR-101744087-B1 English translation (Year: 2017).*
(Continued)

*Primary Examiner* — Ula C Ruddock
*Assistant Examiner* — Anna Korovina
(74) *Attorney, Agent, or Firm* — Womble Bond Dickinson (US) LLP

(57) ABSTRACT

Disclosed in the present invention is a secondary battery in which retainers are coupled between a case and the uncoated portions of electrode assemblies so that the electrode assemblies and current collectors can be fixed and prevented from being separated. Disclosed in one embodiment is a secondary battery comprising: a plurality of electrode assemblies of which each has a cathode plate and an anode plate arranged with a separator therebetween, and which includes the uncoated portions of the cathode plate and the anode plate; a case in which the electrode assemblies are embedded; a cap plate coupled to the case; current collectors respectively coupled to the uncoated portions of the plurality of electrode assemblies through a plurality of coupling portions; and retainers inserted and coupled to on one side of the current collectors, wherein the retainers are coupled to the current collectors through protrusion portions having a width greater than that between the coupling portions of the current collectors.

8 Claims, 10 Drawing Sheets

(51) Int. Cl.

| | | |
|---|---|---|
| *H01M 50/477* | (2021.01) | |
| *H01M 50/486* | (2021.01) | |
| *H01M 50/50* | (2021.01) | |
| *H01M 50/533* | (2021.01) | |
| *H01M 50/534* | (2021.01) | |

(52) U.S. Cl.

CPC ......... *H01M 50/486* (2021.01); *H01M 50/50* (2021.01); *H01M 50/533* (2021.01); *H01M 50/534* (2021.01)

(56) References Cited

U.S. PATENT DOCUMENTS

| | | | |
|---|---|---|---|
| 9,608,256 B2 | 3/2017 | Kwak et al. | |
| 9,666,839 B2 | 5/2017 | Kim | |
| 9,911,962 B2 | 3/2018 | Kim | |
| 2011/0200865 A1 | 8/2011 | Byun et al. | |
| 2011/0311851 A1* | 12/2011 | Shinoda | H01M 10/0431 |
| | | | 429/94 |

| | | | | |
|---|---|---|---|---|
| 2012/0135283 A1* | 5/2012 | Lee | ..................... | H01M 50/538 |
| | | | | 429/82 |
| 2015/0171384 A1* | 6/2015 | Kim | .................. | H01M 10/0413 |
| | | | | 429/149 |
| 2021/0036298 A1* | 2/2021 | Kambayashi | ......... | H01M 50/54 |

FOREIGN PATENT DOCUMENTS

| | | | | |
|---|---|---|---|---|
| KR | 10-1147174 B1 | 5/2012 | | |
| KR | 10-1174899 B1 | 8/2012 | | |
| KR | 10-2015-0000678 A | 1/2015 | | |
| KR | 10-2015-0071530 A | 6/2015 | | |
| KR | 10-1720611 B1 | 3/2017 | | |
| KR | 10-1744087 B1 | 6/2017 | | |
| WO | WO-2019151354 A1 * | 8/2019 | ............ | H01M 50/54 |

OTHER PUBLICATIONS

KR-20150071530A English translation (Year: 2015).*
International Search Report of PCT/KR2020/006194, Aug. 13, 2020, 5 pages.

* cited by examiner

SECONDARY BATTERY

CROSS-REFERENCE TO RELATED APPLICATION(S)

This application is a U.S. National Phase Patent Application of International Application Number PCT/KR2020/006194, filed on May 11, 2020, which claims priority of Korean Patent Application Number 10-2019-0056529, filed on May 14, 2019, the entire content of each of which is incorporated herein by reference.

TECHNICAL FIELD

The present invention relates to a secondary battery capable of suppressing deformation of an electrode assembly and a current collector.

BACKGROUND ART

Unlike a primary battery that cannot be charged, a rechargeable battery can be charged and discharged. A low capacity battery including a battery cell in the form of a pack is used in small portable electronic devices, such as cellular phones or camcorders, while a high capacity battery including tens of battery cells connected to one another is widely used as a power source for driving a motor, e.g., hybrid vehicles, or the like.

Such rechargeable secondary batteries are manufactured in various shapes, representative examples of the shapes may include a cylindrical shape and a prismatic shape. The secondary battery is configured by inserting, into a case, an electrolyte and an electrode assembly which is formed by interposing a separator as an insulator, between positive and negative electrode plates, and installing a cap assembly having electrode terminals in the case.

As the capacity of the secondary battery gradually increases, various efforts are required to promote user safety.

DESCRIPTION OF EMBODIMENTS

Technical Problem

Provided is a secondary battery in which retainers are coupled between a case and the uncoated portions of electrode assemblies so that the electrode assemblies and current collectors can be fixed and prevented from being separated.

Solution to Problem

A secondary battery according to the present invention comprises: a plurality of electrode assemblies of which each has a cathode plate and an anode plate arranged with a separator therebetween, and which includes the uncoated portions of the cathode plate and the anode plate; a case in which the electrode assemblies are embedded; a cap plate coupled to the case; current collectors respectively coupled to the uncoated portions of the plurality of electrode assemblies through a plurality of coupling portions; and retainers inserted and coupled to on one side of the current collectors, wherein the retainers are coupled to the current collectors through protrusion portions having a width greater than that between the coupling portions of the current collectors.

Here, the protrusion portions of the retainers may protrude from the plate-shaped body portion and be coupled between the coupling portions of the current collectors.

In addition, the protrusion portions may be formed between the coupling portions of the current collectors and may include may include a central portion contacting the electrode assembly, and a plurality of elastic portions formed on both sides with respect to the central portion and contacting the coupling portions.

In addition, the central portion may be formed to protrude from the body portion, and the end of a head may contact the electrode assembly.

In addition, the elastic portions may protrude from one side of the peripheral edge of a cut-out hole provided in the body portion, and may be formed to be spaced apart from the central portion.

In addition, the total width of the plurality of elastic portions may be larger than a distance between the coupling portions of the current collectors.

In addition, each of the plurality of elastic portions may have one end coupled to the central portion while cutting the other end thereof opposite to the one end.

In addition, the total width of the other ends of the plurality of elastic portions may be larger than the distance between the coupling portions of the current collectors.

In addition, each of the retainers may further include an additional protrusion portion which is formed between the coupling portions of the current collectors and is configured to have an empty interior.

In addition, the additional protrusion portion may have at least one partition wall formed therein.

In addition, the retainers may be formed of polypropylene (PP) or polyethylene (PE).

Advantageous Effects of Disclosure

The secondary battery according to the present invention may include an electrode assembly and a retainer coupled from one side of a current collector, and may reduce the weight and material of the retainer, and allow the retainer to be maintained at a stably coupled state.

Figure 1:
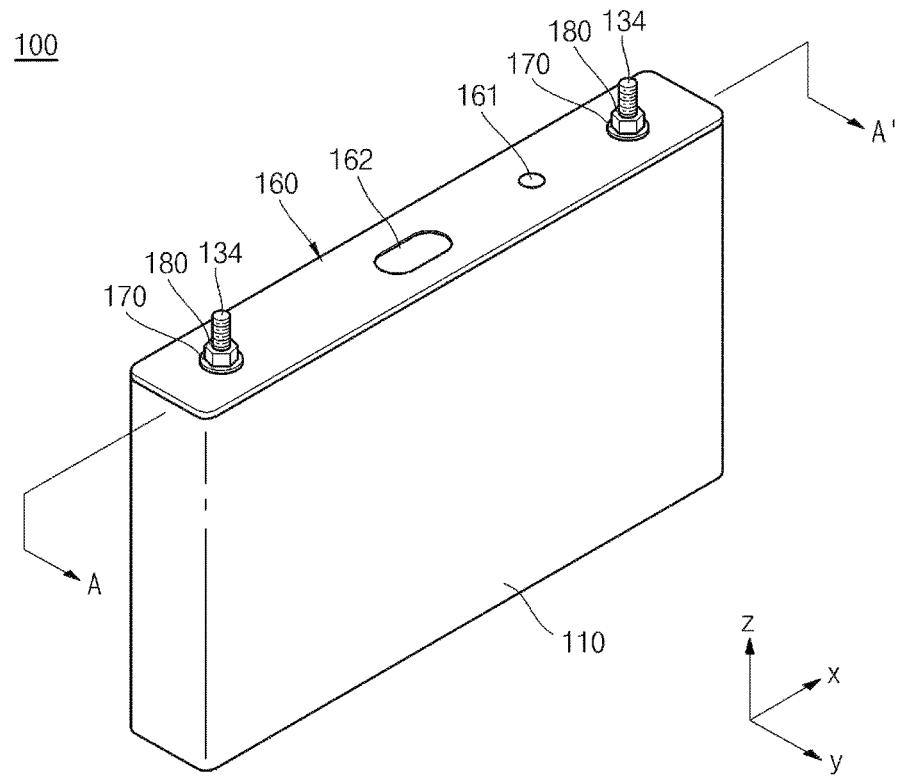
FIG. 1 is a perspective view of a secondary battery according to an embodiment of the present invention.

[Explanation of reference numerals for major parts]

100: Secondary battery
110: Case
120: Electrode assembly
122: Uncoated portion
130: Current collector
133: Coupling portions
133a: First coupling portion
133b: Second coupling portion
133c: Third coupling portion
133d: Fourth coupling portion
140: Retainers
141: Body portion
142: First protrusion portion
142a: Partition wall
143, 243: Second protrusion portion
143a: Central portion
143b: Elastic portion
143c: Head
143d, 243d: Head
150: first insulation member
160: Cap plate
170: second insulation member
180: Nut

BEST MODE

Hereinafter, example embodiments of the present invention will be described in detail.

Embodiments of the present invention are provided to more completely explain the present invention to one skilled in the art. However, the following example embodiments may be modified in various other forms, and the scope of the present invention is not limited to the following example embodiments set forth herein. Rather, these example embodiments are provided so that this disclosure will be thorough and complete and will convey the aspects and features of the present invention to a person skilled in the art.

In addition, in the accompanying drawings, sizes or thicknesses of various components are exaggerated for brevity and clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present therebetween such that the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms that the terms "comprise" and/or "comprising," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present invention.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the element or feature in the figures is turned over, elements described as "below" or "beneath" other elements or features would then be oriented "on" or "above" the other elements or features. Thus, the exemplary term "below" can encompass both an orientation of above and below.

Hereinafter, a configuration of a secondary battery according to an embodiment of the present invention will be described.

Figure 2:
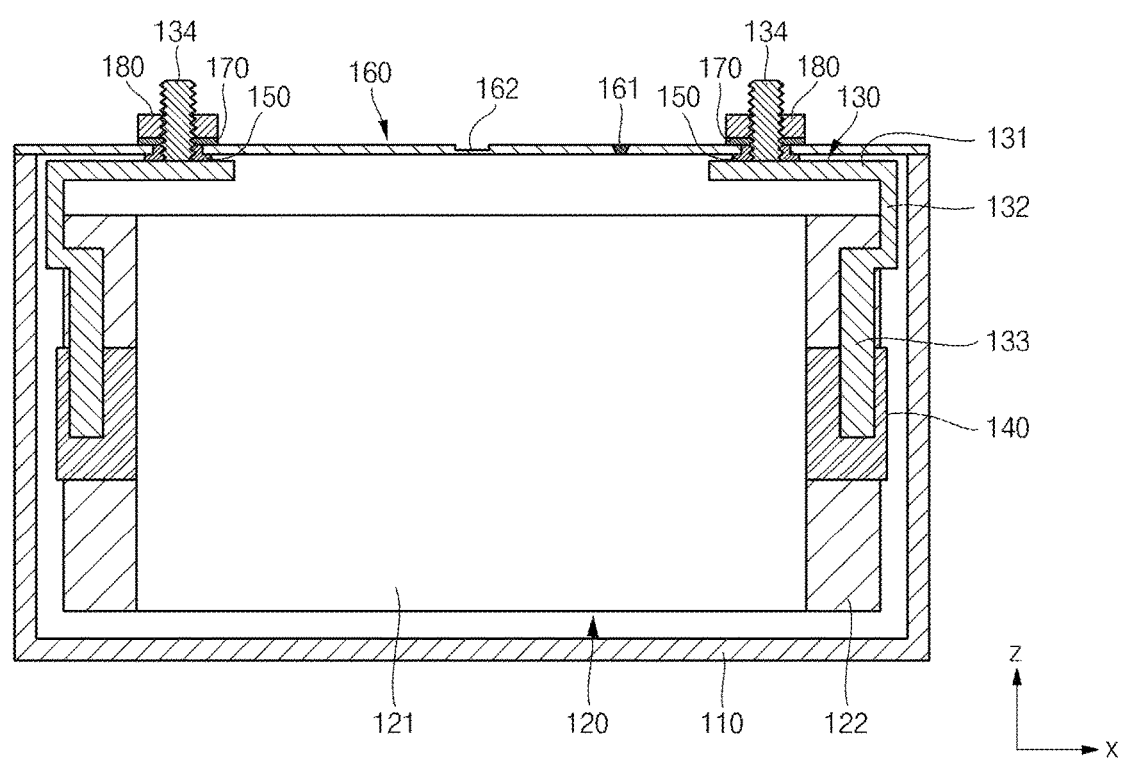
FIG. 2 is a cross-sectional view taken along line A-A' of FIG. 1.
Figure 3:
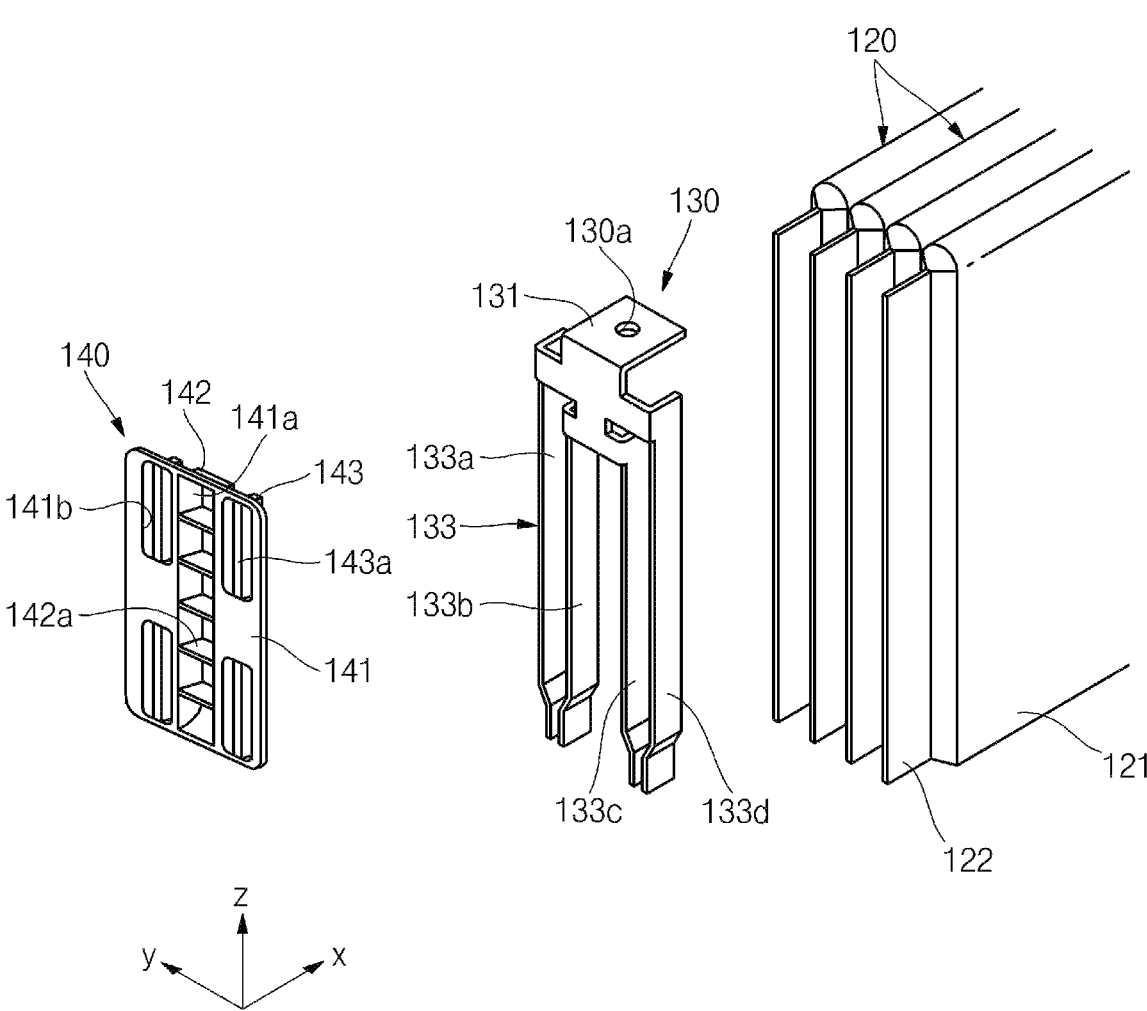
FIG. 3 is an exploded perspective view illustrating the sequence in which an electrode assembly, current collectors, and retainers are coupled in a secondary battery according to an embodiment of the present invention.
Figure 4:
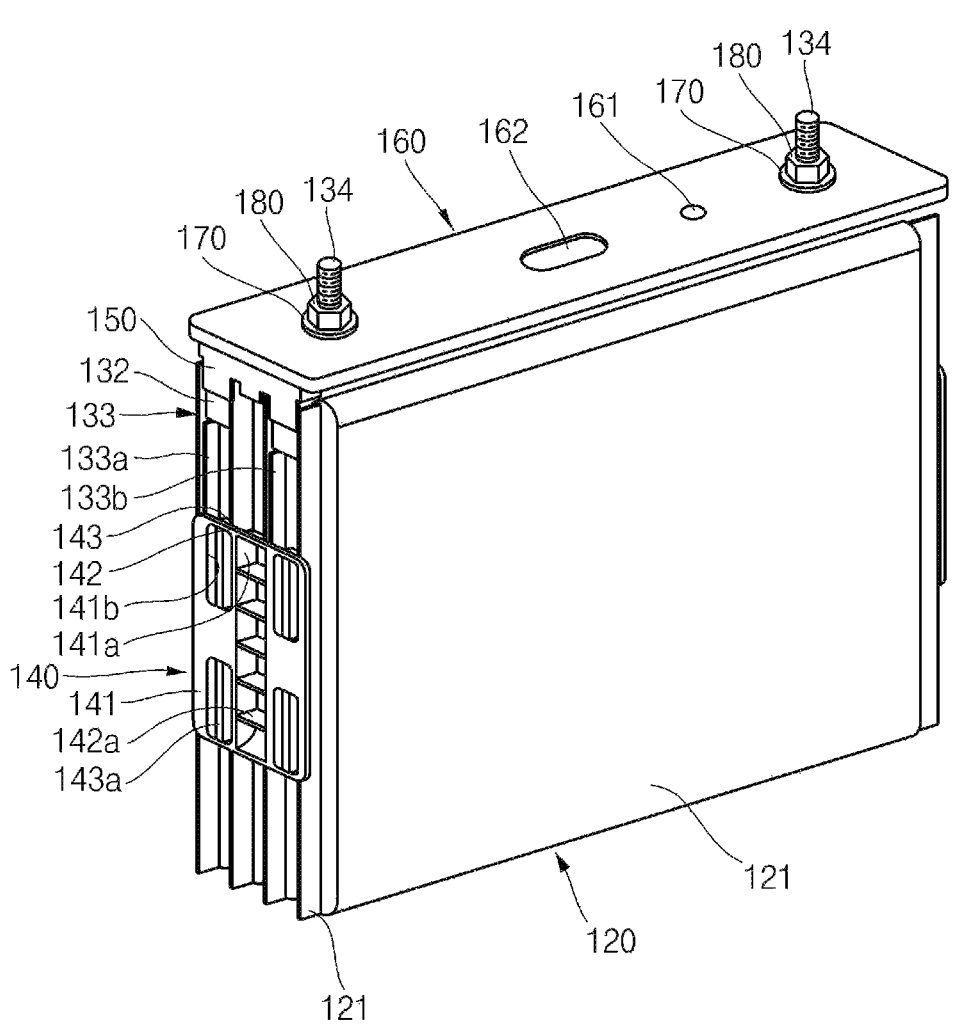
FIG. 4 is a perspective view illustrating a state in which an electrode assembly, current collectors, and retainers are coupled in a secondary battery according to an embodiment of the present invention.

FIG. 1 is a perspective view of a secondary battery according to an embodiment of the present invention. FIG. 2 is a cross-sectional view taken along line A-A' of FIG. 1. FIG. 3 is an exploded perspective view illustrating the sequence in which an electrode assembly, current collectors, and retainers are coupled in a secondary battery according to an embodiment of the present invention. FIG. 4 is a perspective view illustrating a state in which an electrode assembly, current collectors, and retainers are coupled in a secondary battery according to an embodiment of the present invention.

Referring to FIGS. 1 to 4, the secondary battery 100 according to the present invention includes a case 110, an electrode assembly 120 inserted into the case 110, and current collectors 130 connected to the electrode assembly 120, retainers 140 coupled from one side of each of the current collectors 120, a first insulation member 150 formed on top of the current collector 130, a cap plate 160 for sealing the case 110, and a second insulating member 170 formed on the cap plate 160, and a nut 180 formed on the second insulation member 170.

The case 110 is formed in the shape of a substantially hexahedron having an accommodating space therein and an opening formed thereon. The case 110 accommodates the electrode assembly 120 and an electrolyte in the accommodation space. The case 110 is formed of a conductive metal such as aluminum, an aluminum alloy, or nickel-plated steel. Since FIG. 1 shows a state in which the case 140 and the cap plate 160 are coupled to each other, In FIG. 1, the opening is not shown, but corresponds to a portion in which the peripheral portion of the cap plate 160 is substantially opened. In addition, the inner surface of the case 110 may be subjected to insulation treatment so as to be insulated from the electrode assembly 120, the current collector 130, and the cap plate 160.

The electrode assembly 120 is formed by winding or overlapping a laminate of a first electrode plate, a second electrode plate, and a separator positioned therebetween, which are formed in a thin plate shape or a film shape. For example, the first electrode plate may act as an anode, and the second electrode plate may act as a cathode, and vice versa.

The first electrode plate is formed by coating an active material such as graphite or carbon on an electrode current collector formed of a metal foil such as copper or nickel, and an uncoated portion is formed in a region to which the active material is not applied. The second electrode plate is formed by coating an active material such as a transition metal oxide on an electrode current collector formed of a metal foil such as aluminum, and includes an uncoated portion that is a region to which the active material is not applied. The separator is positioned between the first electrode plate and the second electrode plate to prevent short circuit and allow lithium ions to move, and may be made of polyethylene, polypropylene, or a composite film of polyethylene and polypropylene. Meanwhile, the present invention does not limit the materials of the electrode plate and the separator to those listed herein.

The electrode assembly 120 may include a plurality of electrode assemblies and is substantially accommodated in the case 110 together with the electrolyte. Although four of the electrode assembly 120 are illustrated in the present invention, the number of the electrode assembly 120 is not limited thereto. The electrolyte may be formed of a lithium salt such as LiPF6 or LiBF4 in an organic solvent such as ethylene carbonate (EC), propylene carbonate (PC), diethyl carbonate (DEC), ethyl methyl carbonate (EMC), or dimethyl carbonate (DMC). In addition, the electrolyte may be in a liquid, solid or gel phase.

The electrode assembly 120 which is formed by winding the electrode plates may be configured such that a cathode plate and an anode plate, each having a coating portion 121 that is a region to which an active material is applied, and an uncoated portion 122 to which an active material is not applied, are stacked or wound with a separator positioned therebetween. In particular, in the configuration of the electrode assembly 120, a pair of uncoated portions 122 respectively connected to the cathode plate and the anode plate may protrude in opposite directions from both sides of the electrode assembly 120. Accordingly, the uncoated portions 122 are compressed with each other to function as a cathode tab and an anode tab, respectively, on both sides of the electrode assembly 120.

In addition, when the electrode assembly 120 includes a plurality of electrode assemblies, the electrode assembly 120 may be aligned such that the uncoated portions 122 of the same electrode are positioned in the same direction. In addition, electrodes of the secondary battery are formed through a pair of current collectors 130 connected to the uncoated portions 122.

Here, the uncoated portion 122 may be coupled to the current collector 130 through welding. In a state in which a plurality of electrode assemblies 120 are arranged and a plurality of uncoated portions 122 are provided, the current collector 130 is parallel to the uncoated portion 122 in a vertical direction (the z-axis direction in the drawing). Accordingly, the uncoated portions 122 formed in the plurality of electrode assemblies 120 may be electrically connected to each other by the current collector 130.

The current collector 130 is provided as a pair and is connected to the uncoated portions 122 each having one polarity. The current collector 130 is connected to the electrode assembly 120 through the uncoated portion 122, and is exposed to the outside of the cap plate 160 to form an input/output path of an electrical signal.

The current collector 130 includes a body portion 131 that is formed parallel to the horizontal direction (the x-axis direction in FIG. 1) of the electrode assembly 110, a bent portion 132 that is bent from the body portion 131 in the substantially vertical direction (the z-axis direction of FIG. 1), a coupling portion 133 that extends from the bent portion 132 and is coupled to the uncoated portion 122, and a terminal portion 134 that protrudes in the vertical direction (the z-axis direction of FIG. 1) and is exposed to the outside of the cap plate 160.

The body portion 131 is formed in a substantially flat plate shape and is formed on the upper portion of the electrode assembly 110 in the horizontal direction along the length of the electrode assembly 110.

The bent portion 132 is bent in the vertical direction from the body portion 131 and extends in parallel toward the uncoated portion 122. The bent portion 132 has a width enough to cover the uncoated portion 122.

When a plurality of coupling portions 133 are provided to correspond to the number of electrode assemblies 120, for example, when the number of electrode assemblies 120 is four, the coupling portion 133 may include first to fourth coupling portions 133a-133d. The coupling portion 133 is formed to extend from the bent portion 132 in the vertical direction (the –z-axis direction of FIG. 1). The coupling portion 133 is provided in the same number as the uncoated portion 122, and each of the coupling portions 133 extends in parallel while making contact with the uncoated portion 122. That is, the side surface of the coupling portion 133 and the side surface of the uncoated portion 122 extend in parallel with each other while contacting each other in the vertical direction (the –z-axis direction). In addition, the coupling portion 133 forms two pairs 133a and 133b, and 133c and 133d, and one pair of coupling portions, for example, a first coupling portion 133a and a second coupling portion 133b, may be located to contact the interior sides of the pair of uncoated portions 122. That is, the pair of coupling portions 133a and 133b may be located in a state in which the pair of coupling portions 133a and 133b are in contact with the opposite inner surfaces of the pair of uncoated portions 122.

The terminal portion 134 is formed to protrude from the body portion 131 in the vertical direction (the z-axis direction of FIG. 1). Here, the terminal portion 134 may be integrally formed with the current collector 130 or may be separately provided and coupled by, for example, bolting. The terminal portion 134 further protrudes above the cap plate 160 to form an electrode terminal. In addition, the terminal portion 134 has a screw thread formed on the outer circumferential surface thereof, and thus may be coupled with the nut 180 coupled from above.

Hereinafter, the configuration of the retainer 140 will be described with reference to FIGS. 5A to 8.

Figure 5A:
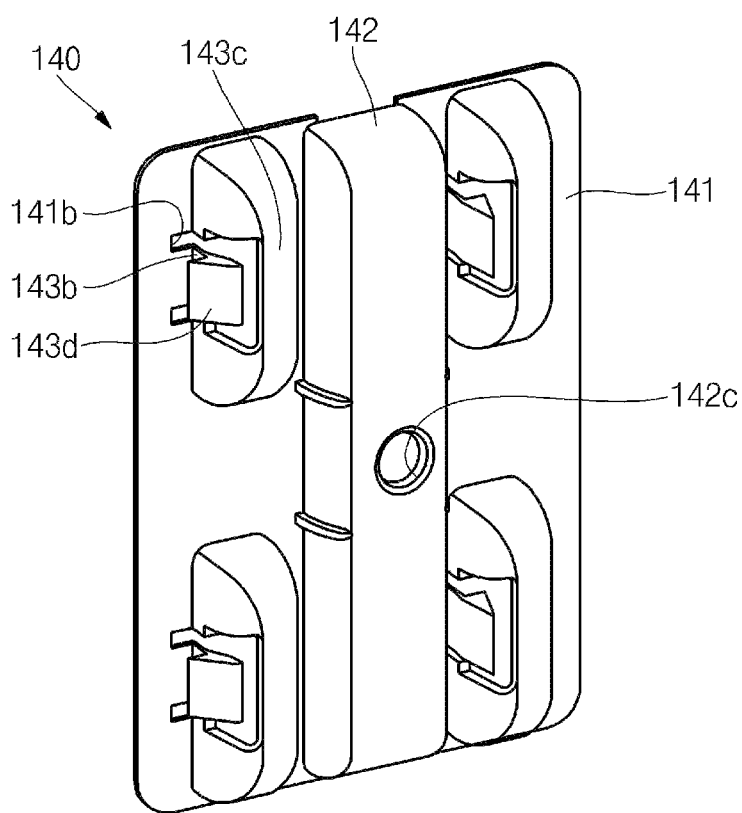
FIGS. 5A to 5C are a perspective view, a front view, and a plan view illustrating the configuration of a retainer in a secondary battery according to an embodiment of the present invention.
Figure 5B:
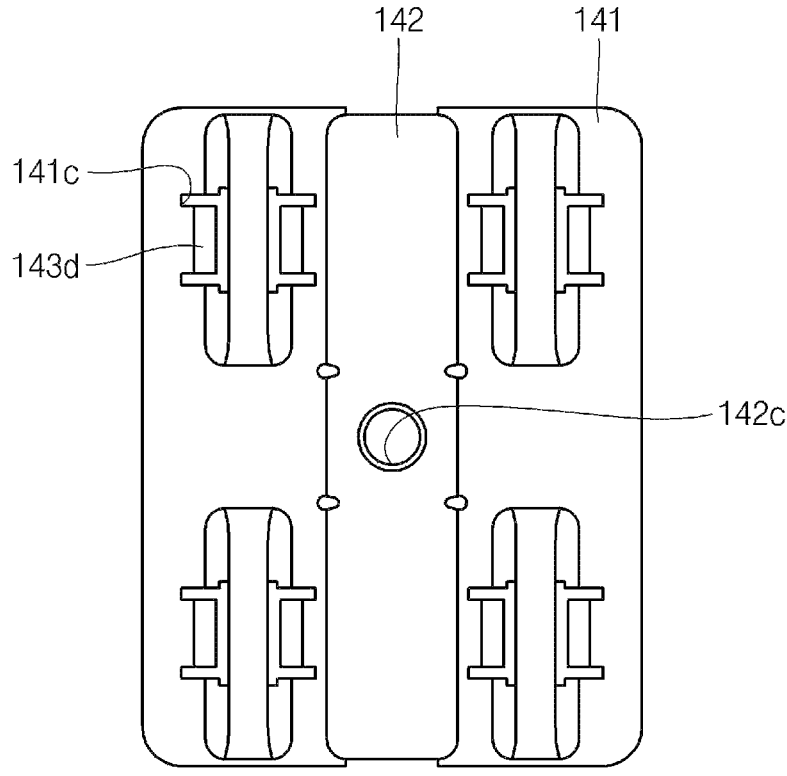
Figure 5C:
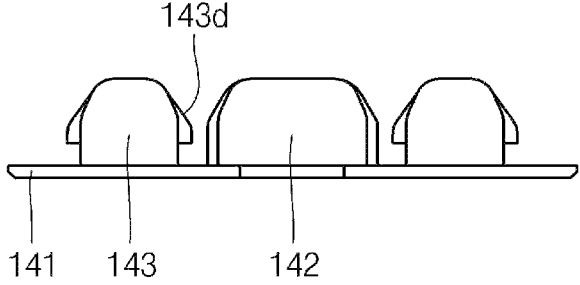
Figure 6:
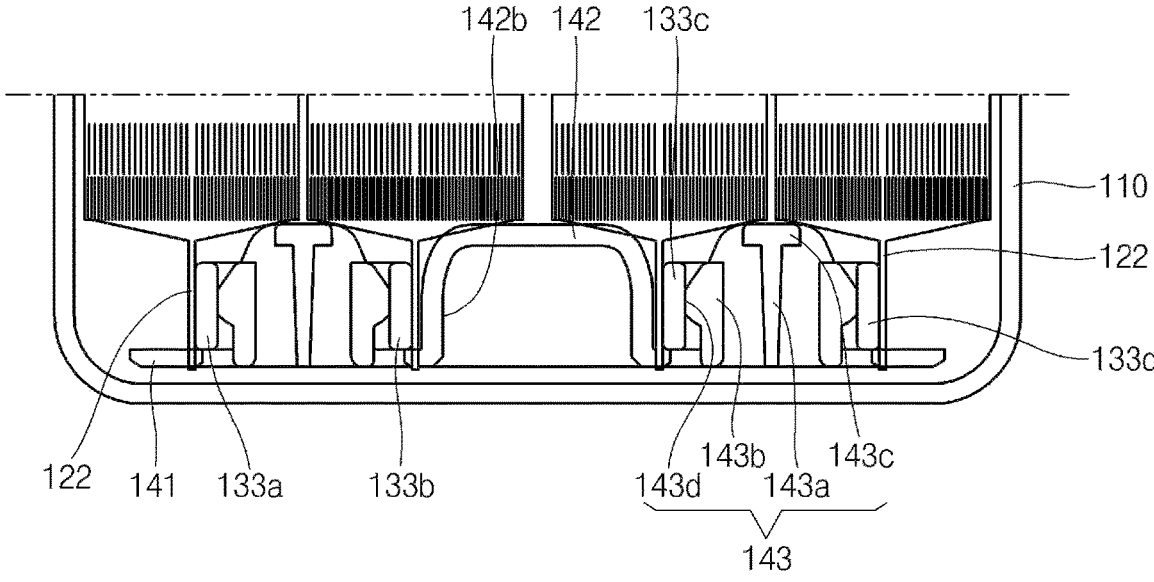
FIG. 6 is a partial cross-sectional view illustrating a state in which a retainer is coupled to a current collector in a secondary battery according to an embodiment of the present invention.
Figure 7:
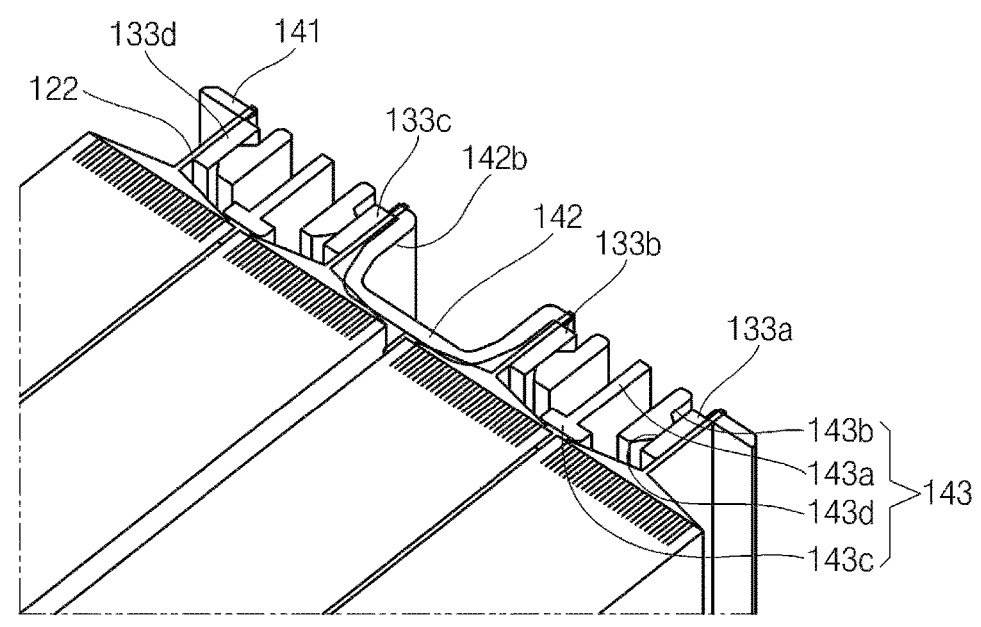
FIG. 7 is a partial perspective view illustrating a state in which a retainer is coupled to a current collector in a secondary battery according to an embodiment of the present invention.
Figure 8:
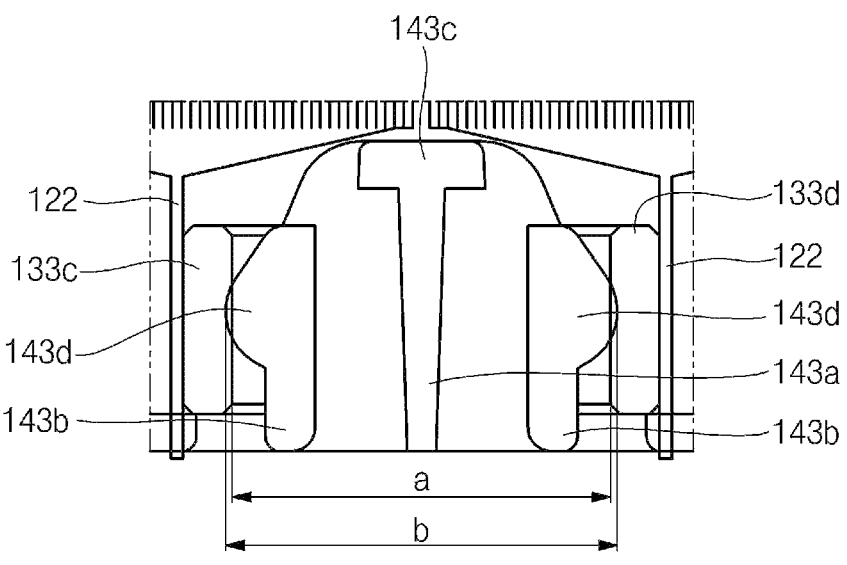
FIG. 8 is an enlarged plan view illustrating a coupling state of a second region of a retainer in a secondary battery according to an embodiment of the present invention.

FIGS. 5A to 5C are a perspective view, a front view, and a plan view illustrating the configuration of a retainer in a secondary battery according to an embodiment of the present invention. FIG. 6 is a partial cross-sectional view illustrating a state in which a retainer is coupled to a current collector in a secondary battery according to an embodiment of the present invention. FIG. 7 is a partial perspective view illustrating a state in which a retainer is coupled to a current collector in a secondary battery according to an embodiment of the present invention. FIG. 8 is an enlarged plan view illustrating a coupling state of a second region of a retainer in a secondary battery according to an embodiment of the present invention.

Referring to the drawings, the retainer 140 may include a pair of retainers, which are respectively coupled to the current collectors 130 from both sides of the electrode assembly 120. The retainer 140 may be made of a plastic material such as polypropylene (PP) or polyethylene (PE) having elasticity. The retainer 140 may be coupled to the coupling portion 133 of each of the current collectors 130, and may be stably coupled between the first to fourth coupling portions 133a-133d constituting the coupling portion 133 through an elastic restoring force.

Specifically, the retainer 140 basically includes a substantially flat body portion 141 and may include a first protrusion portion 142 that protrudes in one direction from the surface thereof, and a plurality of second protrusion portions 143 formed on both sides of the first protrusion portion 142 with respect to.

The body portion 141 is provided in the flat plate shape, and thus, when coupled to the current collector 130, the retainer 140 may be formed in close contact with the current collector 130 in the longitudinal direction.

In addition, the body portion 141 may have a first cutout portion 141a at the center thereof, and the first protrusion portion 142 may protrude along the peripheral edge of the first cutout portion 141a. Accordingly, the first protrusion portion 142 may have an empty shape, thereby reducing the weight and material of the retainer 140.

In addition, the body portion 141 includes a plurality of second cutout portions 141b around the first cutout portion 141a, and some portions of the second protrusion portions 143 may protrude from one-side edges of the second cutout portions 141b. Accordingly, although the second protrusion portions 143 are coupled from the body portion 141 but are still movable, the elastic force of the second protrusion portions 143 may be increased.

The first protrusion portion 142 may be formed to elongate in the vertical direction along the surface of the body portion 141. In addition, since the first protrusion portion 142 is formed along the circumference of the first cutout portion 141a of the body portion 141, the inside thereof is empty, thereby reducing the weight. However, one or more partition walls 142a for maintaining the strength may be formed inside the first protrusion portion 142. The partition walls 142a may be disposed at regular intervals along the vertical direction. Accordingly, when the first protrusion portion 142 touches the electrode assembly 120 by passing through the current collector 130, for example, between the second coupling portion 133b and the third coupling portions 133c, the partition wall 142a supports the first protrusion portion 142 to maintain the shape thereof. In addition, by the partition wall 142, the first protrusion portion 142 can be maintained at a stably coupled state with respect to the electrode assembly 120.

Meanwhile, an air hole 142c may be further formed in the approximately center of the first protrusion portion 142. When the protrusion portion 142 is finally fixed to the electrode assembly 120, the air hole 142c is designed to allow the internal air to escape, thereby enabling closely contacting.

The second protrusion portion 143 may be positioned along the surface of the body portion 141 and around the first protrusion portion 142. The second protrusion portion 143 may include a central portion 143a that protrudes in one direction from the second cutout portion 141b of the body portion 141, and elastic portions 142b that are formed to be horizontally symmetrical with each other around the central portion 143a and protrude from one side of the circumference of the second cutout portion 141b.

Here, the central portion 143a may include a head 143c that protrudes perpendicular to the body portion 141. Here, when the retainer 140 is coupled to the current collector 130, the head 143c of the central portion 143a may pass between the first coupling portion 133a and the second coupling portion 133b and between the third coupling portion 133c and the fourth coupling portion 133d in the current collector 130 to then come into contact with the electrode assembly 120. Therefore, the central portion 143a may allow the second protrusion portion 143 to be maintained at a fixed position with respect to the current collector 130 and the electrode assembly 120.

Meanwhile, the elastic portions 143b may be disposed on both sides of the central portion 143a and may protrude from the edge of one side of the circumference the second cutout portion 141b. The elastic portions 143b may be formed such that the width of opposing heads 143d is larger than that of the head 143c of the central portion 143a. Specifically, the elastic portions 143b are formed such that the width (b) of the opposing heads 143d is larger than a distance (a) between the first coupling portion 133a and the second coupling portion 133b and between the third coupling portion 133c and the fourth coupling portion 133d in the current collector 130. Accordingly, the heads 143d of the elastic portions 143b may be pressed between the first coupling portion 133a and the second coupling portion 133b of the current collector 130 and between the third coupling portions 133c and the fourth coupling portions 133d, and the retainer 140 may be stably coupled to the current collector 130 through the elastic restoring force of the heads 143d.

The first insulation member 150 is formed on the body portion 131 of the current collector 130. The first insulation member 150 is formed between the current collector 130 and the cap plate 160. The first insulation member 150 electrically insulates the current collector 130 and the cap plate 160 from each other. However, the first insulation member 150 may have a terminal hole formed therein to allow the terminal portion 134 of the current collector 130 to pass through the first insulation member 150 to then be upwardly exposed from the cap plate 160.

The cap plate 160 is formed at the upper portion of the case 110 and is coupled to the case 110. The cap plate 160 seals the case 110 to prevent leakage of the electrolyte inside the case 110. The cap plate 160 may have a terminal hole formed therein to allow the terminal portion 134 of the current collector 130 to pass through the terminal hole to then upwardly protrude from the cap plate 160. The cap plate 160 may include an injection hole for injecting an electrolyte into one region thereof, and an injection plug 161 that fills the injection hole after the electrolyte is injected. In addition, the cap plate 160 includes a safety vent 162 approximately at the center. In the safety vent 162, when gas is generated inside the case 110 due to, for example, overcharging, and the pressure inside the case 110 is higher than a reference pressure, the cap plate 160 is opened earlier than other parts of the cap plate 160 to release the gas, thereby reducing the risk of explosion due to an increase in internal pressure.

The second insulation member 170 is formed on the upper surface of the cap plate 160, specifically around the terminal portion 134 of the current collector 130. The second insulation member 170 electrically separates the cap plate 160 and the terminal portion 134 from each other. In addition, the second insulation member 171 allows the nut 180 coupled to the terminal portion 134 on the upper portion of the cap plate 160 to be electrically independent from the cap plate 160.

The nut 180 is coupled to the terminal portion 134 from above. The nut 180 is engaged with a screw thread of the terminal portion 134 through a screw thread formed therein. The nut 180 is fastened to each of the terminal portions 134 and thus fixes the terminal portion 134 to the cap plate 160. Accordingly, the position of the electrode assembly 120 that is coupled to the electrode terminal 134 is also fixed inside the case 110.

As described above, the secondary battery 100 according to an embodiment of the present invention includes the retainers 140 coupled from the side portions of the electrode assembly 120 and the current collector 130, and allows the retainers 140 to be maintained at a stably coupled state while reducing the weight and material of the retainers 140.

Hereinafter, a configuration of a secondary battery according to another embodiment of the present invention will be described.

Figure 9A:
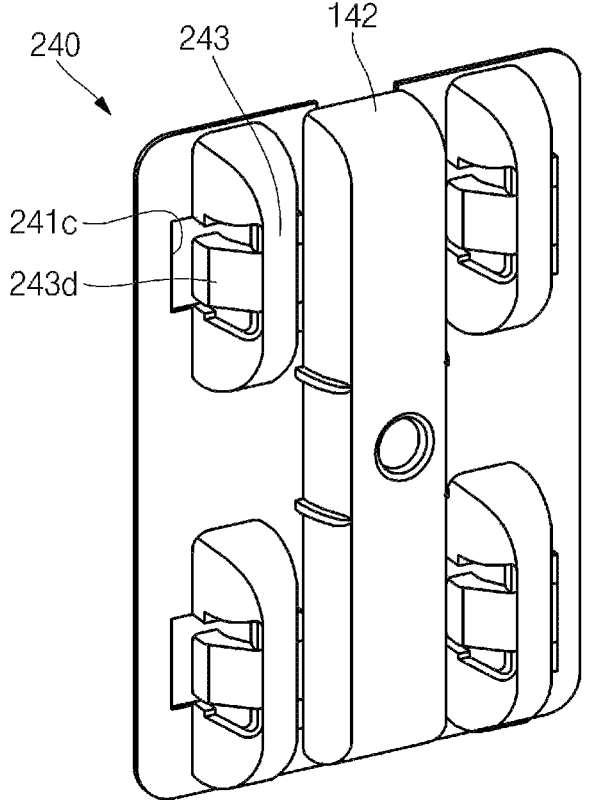
FIGS. 9A to 9C are a perspective view, a front view, and a plan view illustrating the configuration of a retainer in a secondary battery according to another embodiment of the present invention.
Figure 9B:
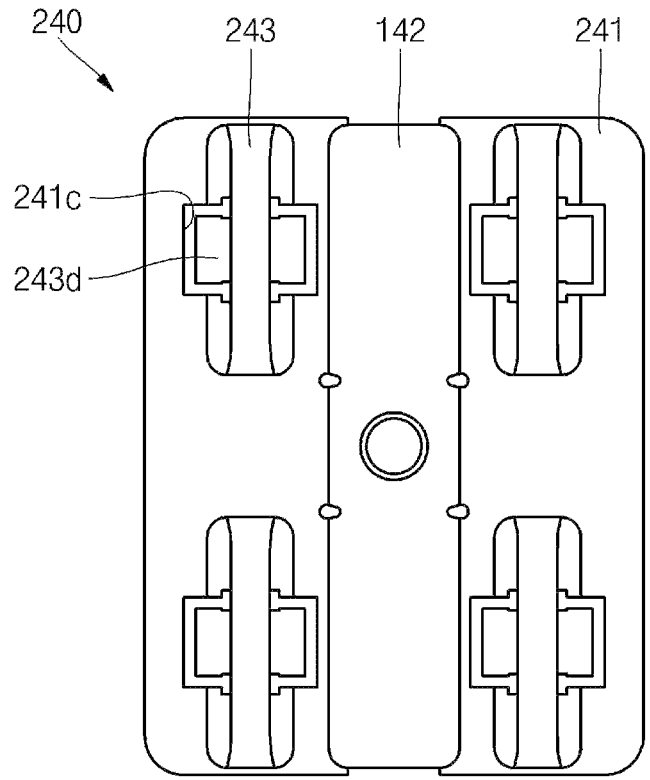
Figure 9C:
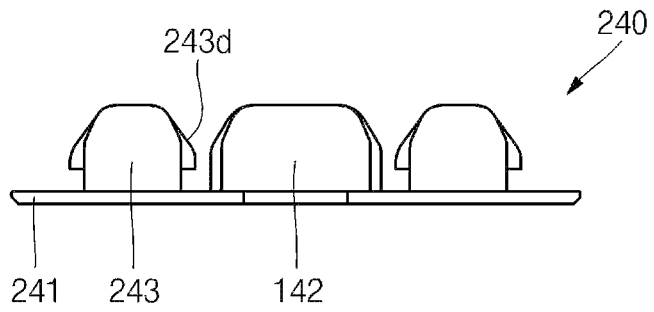
Figure 10:
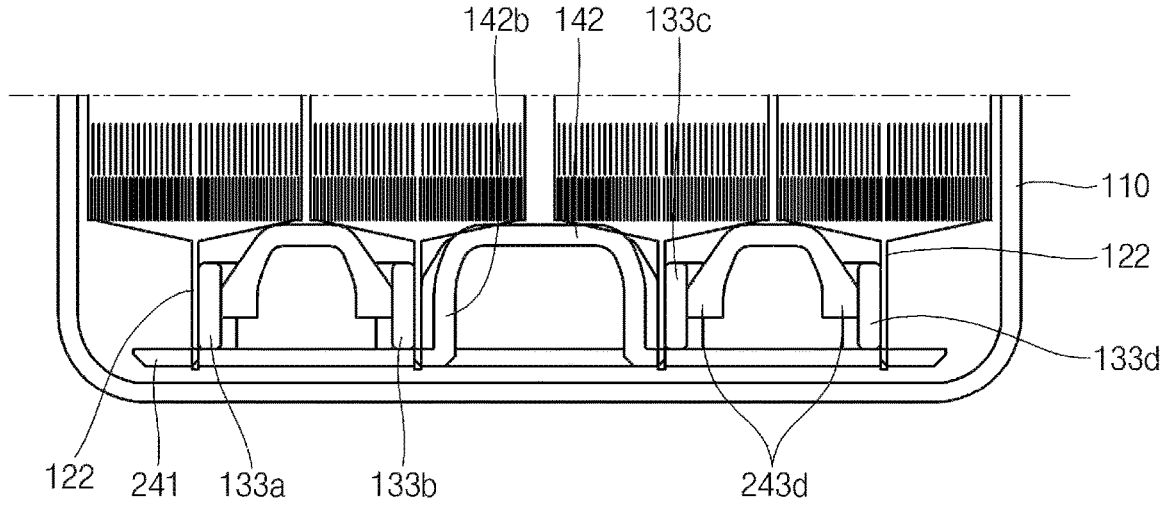
FIG. 10 is a partial cross-sectional view illustrating a state in which a retainer is coupled to a current collector in a secondary battery according to another embodiment of the present invention.
Figure 11:
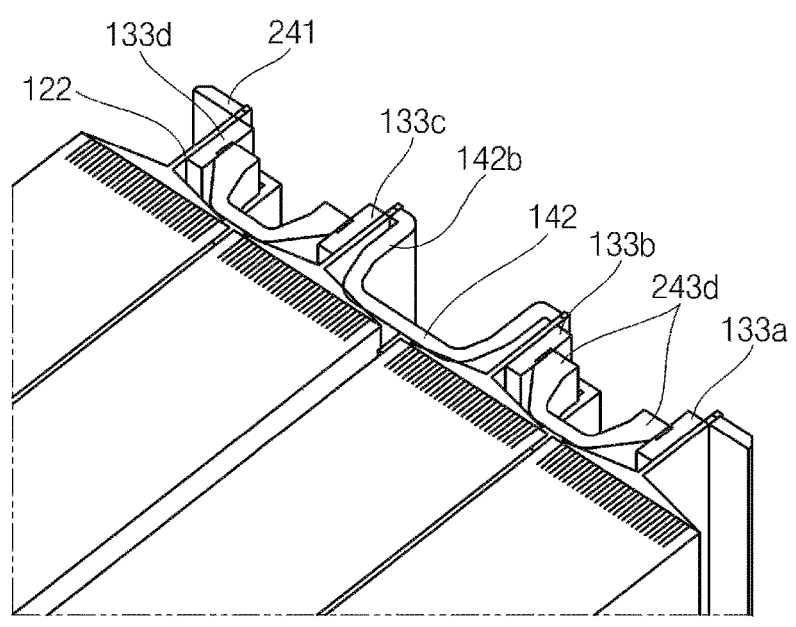

FIGS. 9A to 9C are a perspective view, a front view, and a plan view illustrating the configuration of a retainer in a secondary battery according to another embodiment of the present invention. FIG. 10 is a partial cross-sectional view illustrating a state in which a retainer is coupled to a current collector in a secondary battery according to another embodiment of the present invention.

Referring to FIGS. 9A to 9C, the secondary battery according to another embodiment of the present invention may include a retainer 240. Of course, the secondary battery according to another embodiment of the present invention may also further include a case 110, an electrode assembly 120, a current collector 130, a first insulation member 150, a cap plate 160, a second insulation member 170, and a nut 180, which are the same as those of the previous embodiment, except for the retainer 140, and a detailed description will not be given.

The retainer 240 may include a body portion 241, a first protrusion portion 142, and a plurality of second protrusion portions 243 formed on both sides of the first protrusion portion 142.

Here, the body portion 241 is mostly the same as that of the previous embodiment, but slightly differs from that of the previous embodiment with respect to the configuration of second cutout portions 241c. In detail, as will later be described, elastic portions 243b and heads 243d of the second protrusion portions 243 do not protrude from the second cutout portions 241c, but are connected to central portions 243a of the protrusion portions 243b. Accordingly, the second cutout portions 241c are configured to be separated from the elastic portions 243b and the heads 243d.

Meanwhile, the second protrusion portions 243 may have the heads 243d coupled to both sides from the central portions of the elastic portions 243b. The width of the heads 243d is larger than a distance between the first coupling portion 133a and the second coupling portion 133b and between the third coupling portion 133c and the fourth coupling portion 133d in the current collector 130. Accordingly, the heads 243d are inwardly pressed and coupled between the first coupling portion 133a and the second coupling portion 133b and between the third coupling portions 133c and the fourth coupling portions 133d, respectively, in the current collector 130, thereby maintaining a stably coupled state through an elastic restoring force.

While the foregoing embodiment has been described to practice the secondary battery of the present disclosure, it will be understood by those of ordinary skill in the art that various changes in form and details may be made therein without departing from the spirit and scope of the present disclosure as defined by the following claims.

INDUSTRIAL APPLICABILITY

The present invention provides a secondary battery in which retainers are coupled between a case and the uncoated portions of electrode assemblies so that the electrode assemblies and current collectors can be fixed and prevented from being separated.

The invention claimed is:

1. A secondary battery comprising:
a plurality of electrode assemblies of which each has a cathode plate and an anode plate arranged with a separator therebetween, and portions of the cathode plate and the anode plate comprise uncoated portions;
a case in which the plurality of electrode assemblies are accommodated;
a cap plate coupled to the case;
a plurality of current collectors each respectively coupled to the uncoated portions of the plurality of electrode assemblies through a plurality of coupling portions; and
a plurality of retainers, each retainer of the plurality of retainers being coupled to one side of one of the plurality of current collectors, wherein each of the plurality of retainers are coupled to the plurality of current collectors through a first protrusion portion and second protrusion portions, each of the second protrusion portions having a width greater than that between the coupling portions of the plurality of current collectors,
wherein each of the second protrusion portions comprises a central portion contacting the electrode assembly, and a plurality of elastic portions spaced apart from the central portion on opposite sides of the central portion, the plurality of elastic portions contacting the coupling portions of one of the plurality of current collectors,
wherein the second protrusion portions are located on both sides of the first protrusion portion,
wherein the protrusion portions of each of the plurality of retainers protrude from a plate-shaped body portion and are coupled between the coupling portions of one of the plurality of current collectors, and
wherein the elastic portions protrude from one side of the peripheral edge of a cut-out hole provided in the plate-shaped body portion, and are formed to be spaced apart from the central portion.

2. The secondary battery of claim 1, wherein the central portion is formed to protrude from the plate-shaped body portion, and the end of a head contacts the electrode assembly.

3. The secondary battery of claim 1, wherein a total width of the plurality of elastic portions is larger than a distance between the coupling portions of the one of the plurality of current collectors.

4. The secondary battery of claim 1, wherein the first protrusion portion has an empty interior.

5. The secondary battery of claim 4, wherein the first protrusion portion has at least one partition wall formed therein.

6. The secondary battery of claim 1, wherein the plurality of retainers are formed of polypropylene (PP) or polyethylene (PE).

7. The secondary battery of claim 4, wherein the first protrusion portion comprises an air hole.

8. The secondary battery of claim 1, wherein a number of the coupling portions and the uncoated portions are the same.

\* \* \* \* \*